(12) United States Patent
Sadek et al.

(10) Patent No.: US 8,977,274 B2
(45) Date of Patent: Mar. 10, 2015

(54) GEO-LOCATION AIDED SENSING

(75) Inventors: Ahmed K. Sadek, San Diego, CA (US);
Rahul Tandra, San Diego, CA (US);
Alan Barbieri, San Diego, CA (US);
Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 131 days.

(21) Appl. No.: 13/296,071

(22) Filed: Nov. 14, 2011

(65) Prior Publication Data

US 2012/0122477 A1    May 17, 2012

Related U.S. Application Data

(60) Provisional application No. 61/413,775, filed on Nov. 15, 2010.

(51) Int. Cl.
*H04W 40/00*    (2009.01)
*H04W 16/14*    (2009.01)
*H04W 72/08*    (2009.01)

(52) U.S. Cl.
CPC ............ *H04W 16/14* (2013.01); *H04W 72/082* (2013.01)
USPC ........................... 455/448; 455/450; 455/454

(58) Field of Classification Search
CPC ... H04W 16/14; H04W 72/04; H04W 72/082; H04H 20/42
USPC ........... 455/448, 449, 450, 454, 455; 370/329
See application file for complete search history.

(56) References Cited

U.S. PATENT DOCUMENTS

| | | |
|---|---|---|
| 2008/0299918 A1 | 12/2008 | Jallon |
| 2010/0081433 A1 | 4/2010 | Lee |
| 2010/0091701 A1 | 4/2010 | Youn et al. |
| 2010/0195590 A1 | 8/2010 | Park |
| 2010/0323694 A1 | 12/2010 | Altintas |
| 2011/0090887 A1* | 4/2011 | Kim et al. ..................... 370/338 |
| 2011/0143761 A1 | 6/2011 | Uusitalo et al. |
| 2011/0164581 A1 | 7/2011 | Keon |
| 2011/0250916 A1 | 10/2011 | Li et al. |
| 2012/0185429 A1* | 7/2012 | Shu et al. ..................... 707/609 |

FOREIGN PATENT DOCUMENTS

| | | |
|---|---|---|
| EP | 1708419 A2 | 10/2006 |
| JP | 2005140617 A | 6/2005 |
| JP | 2007166488 A | 6/2007 |

(Continued)

OTHER PUBLICATIONS

International Search Report and Written Opinion—PCT/US2011/060827—ISA/EPO—Jan. 17, 2012.

*Primary Examiner* — Nathan Mitchell
(74) *Attorney, Agent, or Firm* — Charles E. Eggers

(57) ABSTRACT

There lies a challenge to develop a technique of accurately and efficiently determining an available communication channel. In accordance with some embodiments disclosed herein, techniques for sensing a primary user of a particular communication channel are performed more efficiently. In some implementations, a geo-location of a communication device is combined with a sensing algorithm in order to more efficiently perform spectrum sensing. In some implementations, a geo-location and an accuracy determination may be used to determine all required sample regions in order to ensure that a primary user is not present in a particular location.

28 Claims, 15 Drawing Sheets

(56) References Cited

FOREIGN PATENT DOCUMENTS

| JP | 2007300419 A | 11/2007 |
|---|---|---|
| JP | 2009010946 A | 1/2009 |
| JP | 2009200773 A | 9/2009 |
| JP | 2010041101 A | 2/2010 |
| KR | 20080106121 A | 12/2008 |
| WO | WO-2010084801 A1 | 7/2010 |

* cited by examiner

| Location A | Frequency Band 1 | Primary User Identifying Information A1 |
|---|---|---|
| | Frequency Band 2 | Primary User Identifying Information A2 |
| | ⋮ | ⋮ |
| | Frequency Band N | Primary User Identifying Information AN |
| Location B | Frequency Band 1 | Primary User Identifying Information B1 |
| | Frequency Band 2 | Primary User Identifying Information B2 |
| | ⋮ | ⋮ |
| | Frequency Band N | Primary User Identifying Information BN |
| ⋮ | ⋮ | ⋮ |
| Location Z | Frequency Band 1 | Primary User Identifying Information Z1 |
| | Frequency Band 2 | Primary User Identifying Information Z2 |
| | ⋮ | ⋮ |
| | Frequency Band N | Primary User Identifying Information ZN |

306

Figure 3 to# GEO-LOCATION AIDED SENSING

CLAIM OF PRIORITY UNDER 35 U.S.C. §119

This application claims the benefit under 35 U.S.C. §119 of commonly owned U.S. provisional patent application Ser. No. 61/413,775, filed Nov. 15, 2010, which is hereby expressly incorporated by reference herein.

BACKGROUND

1. Field

The present application relates to wireless communication, and in particular, to systems, methods and devices to enable management of frequency spectrum.

2. Background

The popularity of high-rate wireless data services is increasing the demand for access to available frequency spectrum by both organized and ad hoc wireless networks. The ability to satisfy the demand is often limited by a lack of available frequency spectrum that may be used for reliable communications within a geographic area. Given the limitations of the natural frequency spectrum and the licensed spectrum model adopted in most countries, there lies a challenge to accommodate the increasing demand for spectrum access.

In most countries, the available frequency spectrum has been divided into a number of licensed and unlicensed frequency bands. Wireless cellular networks and some television channel transmissions typically operate in a licensed frequency band. A network operator is often a primary user or licensee of a particular licensed band. As the primary user, the network operator, is allowed to exclude all other potential users, so that non-authorized sources of interference are minimized.

A drawback of the licensed spectrum model is that it can lead to under-utilization of a licensed frequency band. For example, there may be occasions when network utilization by the primary user is low, and/or there are geographic regions where there are few end users for the network operated by the primary. Simultaneously, communication on unlicensed bands may be congested with one or more users unable to access the unlicensed band for reliable communication.

Cognitive radio has been proposed to enable spectrum sharing. Spectrum sharing allows secondary users access to licensed portions of frequency spectrum when the primary user is not using a respective licensed frequency band at a given time and/or in a particular geographic location. Nevertheless, the primary user network has priority, and it is desirable to reduce, if not wholly eliminate, interference with primary user network communications. Hence, there lies a challenge for a secondary user to identify the presence of primary user network communication as quickly and efficiently as possible and vacate the respective licensed band as quickly as possible to mitigate interference with the primary user network.

SUMMARY OF THE INVENTION

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to sense the presence of a primary user and the like.

One aspect of the disclosure provides a method implemented in a wireless apparatus configured for communication in a network. The method comprises determining an area within which the wireless apparatus is located. The method further comprises identifying a plurality of regions, each region corresponding to a portion of the area. The method further comprises receiving information regarding the plurality of regions, wherein the information is indicative of one or more communication channels being allocated for communication within one or more of the plurality of regions. The method further comprises sensing for communications on the one or more communication channels. The method further comprises determining availability of the one or more communication channels based on the sensing.

Another aspect of the disclosure provides a wireless apparatus configured for communication in a network. The apparatus comprises a processor configured to determine an area within which the wireless apparatus is located. The processor is further configured to identify a plurality of regions, each region corresponding to a portion of the area. The apparatus further comprises a receiver configured to receive information regarding the plurality of regions, wherein the information is indicative of one or more communication channels being allocated for communication within one or more of the plurality of regions. The apparatus further comprises a sensing module configured to sense for communications on the one or more communication channels. The processor is further configured to determine availability of the one or more communication channels based on the sensing.

Another aspect of the disclosure provides a wireless apparatus configured for communication in a network. The apparatus comprises means for determining an area within which the wireless apparatus is located. The apparatus further comprises means for identifying a plurality of regions, each region corresponding to a portion of the area. The apparatus further comprises means for receiving information regarding the plurality of regions, wherein the information is indicative of one or more communication channels being allocated for communication within one or more of the plurality of regions. The apparatus further comprises means for sensing for communications on the one or more communication channels. The apparatus further comprises means for determining availability of the one or more communication channels based on the sensing.

Another aspect of the disclosure provides a computer program product comprising a non-transitory computer readable medium having stored thereon code. The code causes a computer to determine an area within which a wireless apparatus is located. The code further causes a computer to identify a plurality of regions, each region corresponding to a portion of the area. The code further causes a computer to receive information regarding the plurality of regions, wherein the information is indicative of one or more communication channels being allocated for communication within one or more of the plurality of regions. The code further causes a computer to sense for communications on the one or more communication channels. The code further causes a computer to determine availability of the one or more communication channels based on the sensing.

BRIEF DESCRIPTION OF THE DRAWINGS

FIG. 3 is a representation of a sample database for use in some embodiments.

Figure 1A:
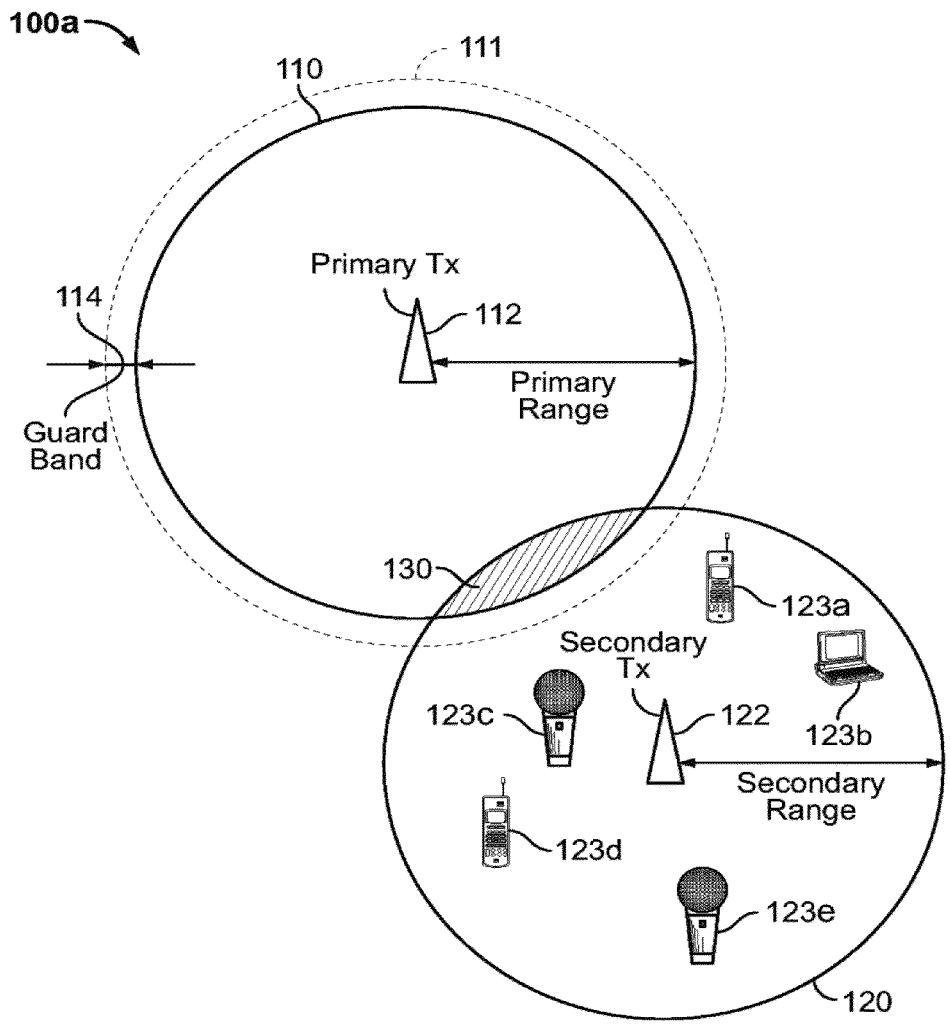
FIG. 1A is a simplified block diagram of several sample aspects of a portion of a wireless communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, IEEE 802.22, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G network, typically referred to as a macro cell network) and smaller scale coverage (e.g., a residence-based or building-based network environment). As an access terminal (AT) or user equipment (UE) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on.

Under-utilized portions of frequency spectrum are sometimes referred to as spectral holes and/or white space. Cognitive radio has been proposed to enable spectrum sharing when spectral holes and/or white space are present in licensed frequency bands.

In cognitive radio terminology, primary users can be defined as the users who have higher priority or legacy rights on the usage of a specific part of the spectrum, such as a licensed frequency band. On the other hand, secondary users have lower priority, and exploit the spectrum in such a way that they do not cause undue or overly burdensome interference to primary users.

Spectrum sharing allows secondary users access to licensed portions of frequency spectrum when the primary user is not using a respective licensed frequency band at a given time and/or in a particular geographic location. In other words, a secondary user detects times when a specific licensed band is unused in a particular area and then uses the band for transmission without causing any significant interference to the transmissions of the license-holder. Therefore, in one implementation secondary users have cognitive radio capabilities, such as the ability to monitor the spectrum reliably to check whether it is being used by a primary user and the ability to change the radio parameters to exploit the unused part of the spectrum.

Figure 1B:
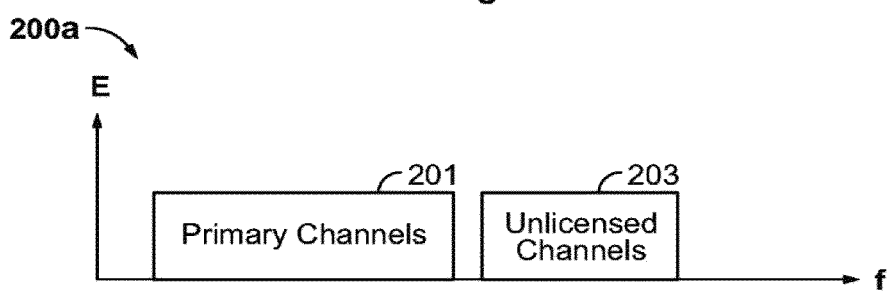
FIG. 1B is a simplified frequency diagram of example channels in the wireless communication system of FIG. 1A.

FIG. 1A is a simplified block diagram of several sample aspects of a portion of a wireless communication system 100a. FIG. 1B is a simplified frequency diagram of example channels in a portion of spectrum 200a used by the wireless communication system 100a of FIG. 1A. The portion of spectrum 200a includes a frequency band of primary channels 201 and a frequency band of unlicensed channels 203. The unlicensed channels 203 may be less desirable because of heavy congestion, the presence of unregulated transmitters, and/or the natural propagation characteristics of the unlicensed band of spectrum.

With further reference to FIG. 1A, the system 100a includes a primary user base station 112 and a secondary user base station 122. The secondary network has, for example, five secondary user nodes 123a, 123b, 123c, 123d, 123e. Those skilled in the art will appreciate that the primary and secondary networks can each include any number of user nodes.

The primary user base station 112 has a usable range indicated by 113, and a total coverage area indicated by 110. Beyond the primary user range 113, there is a guard band 114 in which transmissions from the primary user base station 112 can be received, even if only weakly. The total primary user area covered by the guard band 114 is indicated by 111. The secondary user base station 122 has a usable range indicated by 124, and a total coverage area indicated by 120. The area 130 represents geographic area where coverage areas 110, 120 of the primary and secondary user base stations 112, 122 overlap.

If the primary user network is under-utilized in the area 130, the secondary network can extend transmissions into the area 130 to take advantage of a spectral hole in the primary channels 201. However, as soon as the primary user network becomes more active, the secondary network must vacate the primary channels 201 at least in the area 130. For example, secondary network adapts by switching to the unlicensed channels 203. This process may be subject to certain regulatory schemes. For example, if a primary Tx 112 is active or transmitting in any primary user area 111, a secondary Tx 122 may not operate in any part of the primary user area 111. Thus, the secondary Tx 122 may not extend transmissions into the area 130. For simplicity, under such a scheme, a secondary Tx 122 may only be capable of transmitting signals in a primary user area 111 if the primary Tx 112 is not active. Once a primary Tx 112 becomes active, the secondary Tx 122 may be required to immediately vacate the area 111. However, the various embodiments described herein are not limited to operations according to any such single scheme, and may incorporate an extension of transmission into the area 130 as discussed above where appropriate.

An example of an under-utilized frequency spectrum may include the TV frequency band. The TV frequency band is generally under-utilized by licensed users. Furthermore, the TV frequency band displays excellent signal to noise characteristics since it may occupy a frequency space above 100 Mhz.

Certain rules allow unlicensed operation in the TV white space, where TV white space refers to TV channels not used by TV band primary users. TV band primary users may be digital TV (ATSC), analog TV (NTSC), and/or wireless microphones. Devices transmitting in the TV white space are denoted as TV band devices (TVBDs). TVBDs can be any wireless terminal such as an access point, a user equipment, a femto cell, a WLAN access point, a WLAN station, or any general wireless device.

According to the Federal Communications Commission (FCC) before transmitting in a TV band, a TVBD must check for the availability of a TV channel (i.e., a particular frequency range (e.g., a 6 MHz band)) either through spectrum sensing or by using geo-location and database lookup. Thus, before a TVBD transmits in a TV white space, the TVBD may check that the TV channel is empty from TV primary users. The TVBD can infer the presence or absence of the TV primary users either through spectrum sensing or through communication with a database having registered primary user information. Certain regulatory schemes contemplate a database populated by all primary users of a particular frequency band at a given geo-location. However, a TVBD may be required to know its geo-location within a certain accuracy, for example fifty meters, to determine whether the TV channel is empty from TV primary users registered in the database. As a result, it may not always be practicable to have a device capable of determining such an accurate geo-location. A device may not be equipped with such geo-location determination capability, or may be in a geo-location that does not allow for the determination of the geo-location to the degree of accuracy required by such a scheme.

Spectrum sensing alone has been proposed as an alternative for determining the presence of a primary user, but is often inefficient in this task. For example, a primary user of a TV channel or other licensed channel may be a wireless microphone or similar device having a low signal to noise ratio, making such a device communicating in a particular channel or frequency band is difficult to sense. Furthermore, to detect a narrow-band primary user device occupying only a relatively small portion (e.g., 200 kHz) of a wide-band channel (e.g., 6 MHz), the entire wide-band channel should be sensed for transmissions from the primary user device. For example, a wireless microphone may operate in a TV channel having a 6 MHz bandwidth and only transmit in a 200 kHz range, but detection of the microphone within the channel would typically require scanning the entire channel 6 Mhz bandwidth for a communication from the microphone.

In some embodiments a coarse geo-location technique that can determine a device location within X meters (where X may be greater than 50 meters) is used to determine availability of particular frequency ranges for communication. Accordingly, the device is able to determine within an area defined by a circle of radius X centered at the coarse location, the actual position of the device. Based on this information, the device may divide the area into a grid made up of a plurality of grid areas. Each grid area may have an entry in a database that stores information as to what devices are communicating in that particular grid area and/or which frequency range(s) are being used in that particular grid area. The device may query this information for each of the plurality of grid areas that make up the area where the device may be located and use this information to determine availability of particular frequency ranges for communication.

In one embodiment, the device may determine availability of particular frequency ranges based on the received information for a plurality of grid areas itself. For example, the device may conservatively determine that a frequency range used in any of the plurality of grid areas is a frequency range that is being used and therefore not available for communication. This may be overly inclusive and exclude the use of some frequency ranges that may actually be available for communication.

In another embodiment, the device may determine availability of particular frequency ranges based on the received information for a plurality of grid areas and spectrum sensing. The device may determine all the frequency ranges used in any of the plurality of grid areas. For example, one grid area may use a first and second frequency range, and another grid area may use a second and a third frequency range. Accordingly, the device may determine the first, second, and third frequency ranges are potentially being used and are not available for communication. The device may then scan only these frequency ranges, which may be much smaller (e.g., 200 kHz each) than the overall frequency range (e.g., 6 MHz) the device is attempting to communicate over. If signals are detected on any of these first, second, or third frequency ranges, the device determines that the frequency range over which the signal is detected is unavailable. The remaining frequency ranges are determined to be available for communication. The initial coarse geo-location, therefore, allows a smaller frequency range to be scanned which reduces overhead.

According to some embodiments, a solution may be realized by employing a sensing algorithm that uses a geo-location and a received information regarding the users of a particular frequency band in relation to the geo-location in order to more efficiently perform spectrum sensing. The received information may include querying a database containing information regarding the primary users of a given frequency band, but is not limited thereto. For example, the database may include information indicating which frequency bands are already allocated (i.e., being used for communications) by primary users in a particular geographic area. The database may have information about several geographic areas, which may, for example, span approximately 50 meters radially from a point. In addition, or in the alternative, the database may have information regarding the waveform(s) used by the primary users for communications in the several geographic areas. By employing such a sensing algorithm, the technology used for geo-location could have a lower accuracy than previously required. The information received or provided from the database could also be utilized by sensing to achieve a performance better than performing sensing or geo-location alone. Furthermore, a primary user device, such as a TVBD, may obtain a coarse geo-location measurement by listening to signals from other users like cell phone towers, WiFi access points etc. For example, the TVBD may be in communication with another device, such as a cell phone tower, which has a known geo-location. Thus, the TVBD may determine it is within a communication radius of the other device. The TVBD may make the determination of the location of the other device and its communication radius based on the cellular identifier of the other device. Hence the overhead in obtaining this coarse geo-location measurement is much less than requiring a geo-location with a greater accuracy, such as within fifty meters.

Figure 2:
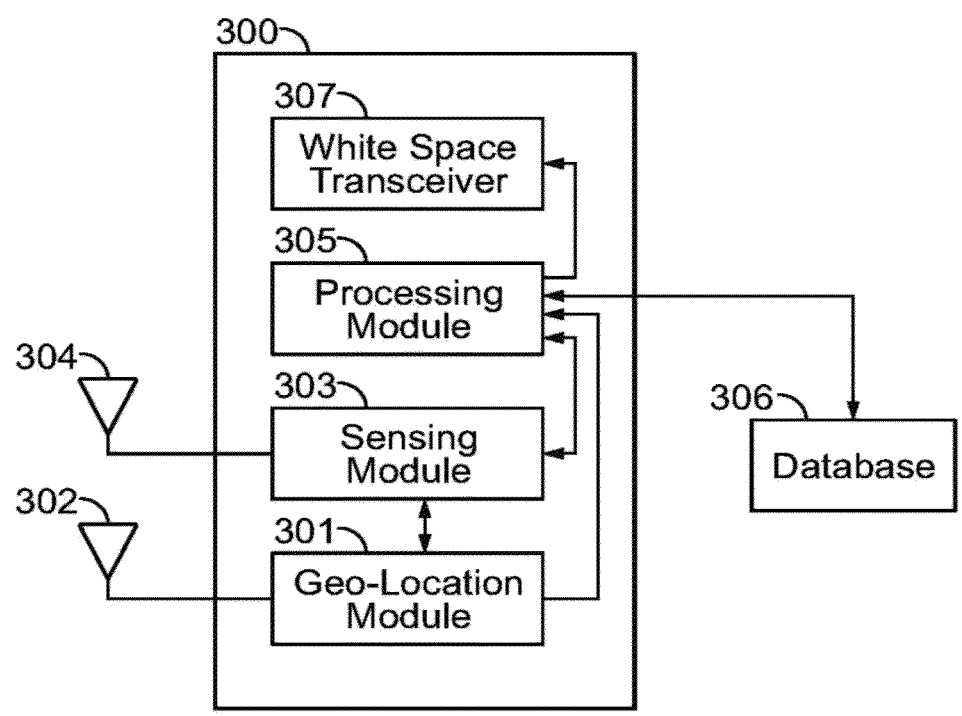
FIG. 2 is a schematic representation of an implementation of a device.

FIG. 2 is a simplified diagram of a wireless communication device according to some embodiments. The wireless communication device 300 may be a TV Band Device (TVBD) but is not limited thereto. The wireless communication device 300 includes a geo-location module 301, a geo-location antenna 302, a sensing module 303, a sensing antenna 304, a processing module 305, and a white space transceiver 307.

The geo-location module 301 is capable of determining a geographic or geo-location of the wireless communication device through signals transmitted and received by the geo-location antenna 302. The geo-location module may be capable of determining the geo-location with a great degree of accuracy by employing a Global Positioning System (GPS) or the like. The geo-location module 301 may also only be capable of determining a geo-location with a lesser degree of accuracy such as a terrestrial triangulation device or the like. For example, the geo-location module 301 may have a GPS receiver, a GPS receiver assisted with WAN localization, sensing for nearby WLAN access points and inferring location based on the WLAN access points, or any localization technology. The geo-location module 301 may be capable of performing an accurate geo-location determination in certain environments, and a less accurate geo-location in other environments. For example, the geo-location module 301 may be capable of determining an accurate geo-location while signal reception and/or network strength is high, and may be capable of determining a less accurate geo-location when signal reception and/or network strength is low, such as the interior of a building or other structure.

The geo-location module 301 may be capable of communicating a geo-location to a processing module 305. The processing module may be capable of determining an accuracy of the geo-location based on the capabilities of the device and the information received from the geo-location module 301. The processing module 305 may use the communicated geo-location in communicating with a database 306 to receive available communication channels or available frequency bands for communication and primary user identifying information based on the geo-location.

The processing module 305 may also receive information from a sensing module 303. The sensing module 303 may be capable of sensing a particular communication based on at least one sensing parameter. For example, the sensing module may monitor a particular frequency for a communication signal by detecting the communication signal at sensing antenna 304. The sensing module may be tuned by the processor to sense a primary user communication signal for a particular set of sensing parameters. The sensing parameters may include one or more of a signal strength or transmit power, signal geo-location, a frequency associated with the signal, a particular frequency range or channel, and a waveform used for communication by primary users. Such sensing parameters may be based on information received from a database 306 discussed further below. For example, the sensing module may use the signal geo-location and the natural attenuation of the signal strength in order to determine if the sensed transmission belongs to a primary user. In another embodiment, the sensing module 303 may use the particular frequency range and waveform information to sense for communications in the particular frequency range that are similar to the waveform. This may aid in distinguishing transmissions of primary user devices from background noise the noise is unlikely to resemble the waveform. The sensing module 303 may communicate a result of the sensing to the processing module 305.

The processing module 305 may be capable of communicating with a database 306. The database 306 may be any data structure or memory unit containing information regarding primary users and available frequencies or available communication channels. The information regarding primary users may include information regarding specific frequency ranges (e.g., 200 kHz) the primary users communicate over and/or information regarding the waveforms used for communications by the primary users. The database 306 may reside in a fusion center, an access terminal or any communication device in the communication network. For example, the database 306 may be a server that the wireless communication device may communicate with through a network or internet connection.

The processing module 305 may transmit the geo-location information received from the geo-location module 301 to the database 306, and request information regarding primary users and available frequencies or available communication channels based on the geo-location information. The database 306 may transfer information regarding available frequencies or available communication channels and primary user identifying information to the processing module 305 based on the geo-location information. The processing module 305 may adjust one or more parameters of the sensing module 303 to sense for a primary user based on the received information from the database 306. The sensing module 303 may communicate a sensing result to the processing module 305. The processing module 305 may then determine the presence or absence of a primary user based on the sensing result and determine the available frequencies or available communication channels (white space) based on the determination.

The processing module 305 may be configured to communicate with a white space transceiver 307 regarding the determined available frequencies or available communication channels. The white space transceiver 307 may be tuned to communicate only in available frequencies or available communication channels as determined by the processing module 305.

FIG. 3 is a representation of a sample database for use in some embodiments. A database 306 may include information regarding available frequencies or available communication channels and primary user identifying information categorized by geo-location. The information regarding primary users may include information regarding specific frequency ranges (e.g., 200 kHz) the primary users communicate over and/or information regarding the waveforms used for communications by the primary users in the geo-location categories. The processing module 305 may query the database 306 in order to receive information for at least one of the geo-locations in the database 306. The database 306 may receive the requests or queries from the device and transmit information regarding available communication channels and primary user information at a sampled region.

FIGS. 2 and 3 show one implementation of a device 300 and a database 306 according to some embodiments. However, modules 301-305 and 307 may reside outside of the device 300. Furthermore, modules 301-305 and 307 may not be required for a device not having all of the capabilities of the various embodiments described herein. For example, a device which performs only querying of the database as will be described with respect to FIG. 10 below would not require a sensing module 303. A device incorporating a network-assisted method as will be discussed below may also not require a sensing module 303 and/or a geo-location module 301.

For example, a processing module 305 may query the database with a geo-location corresponding to Location A. In response, the database 306 may transmit all information regarding Frequency Band 1 through Frequency Band N, as well as the Primary User Identifying Information A1 through AN for each of the available frequency bands. The processing module 305 may also query a database 306 for a particular frequency band and a particular geo-location. In response, the database 306 may transmit only the primary user identifying information corresponding to the particular geo-location and particular frequency band. For example, a processing module 305 may query a database for information regarding a geo-location corresponding to Location B and for a frequency corresponding to Frequency Band 2. As a result, the database 306 may transmit the Primary User Identifying Information B1. The processing module 305 may also query the database multiple times for a geo-location having a low accuracy as will be later described. Those skilled in the art will appreciate that the database is not limited to any particular number of geo-locations, frequency bands, communication channels, or primary user identifying information corresponding to the geo-locations and frequency band or communication channel information.

The primary user identifying information may include information regarding one or more primary users of a particular frequency band. The primary user identifying information may include one or more of a signal strength, primary user geo-location, a frequency associated with a primary user, a particular frequency band or channel for primary user communication, or a waveform used for communication by the primary user. While not shown in FIG. 3, those skilled in the art will appreciate that the system is not limited to a primary and secondary user network. The system may include any number of primary users over a given channel. Additionally and/or alternatively, a hierarchy of priority among the users can be applied such that a user having a higher priority to a channel is not interfered with by a user having a lower priority over the channel.

The database 306 may be configured to be updated by the devices that communicate with the database 306 to perform sensing of a primary user. This process will be described in greater detail with reference to FIGS. 8-9 below.

Figure 4:
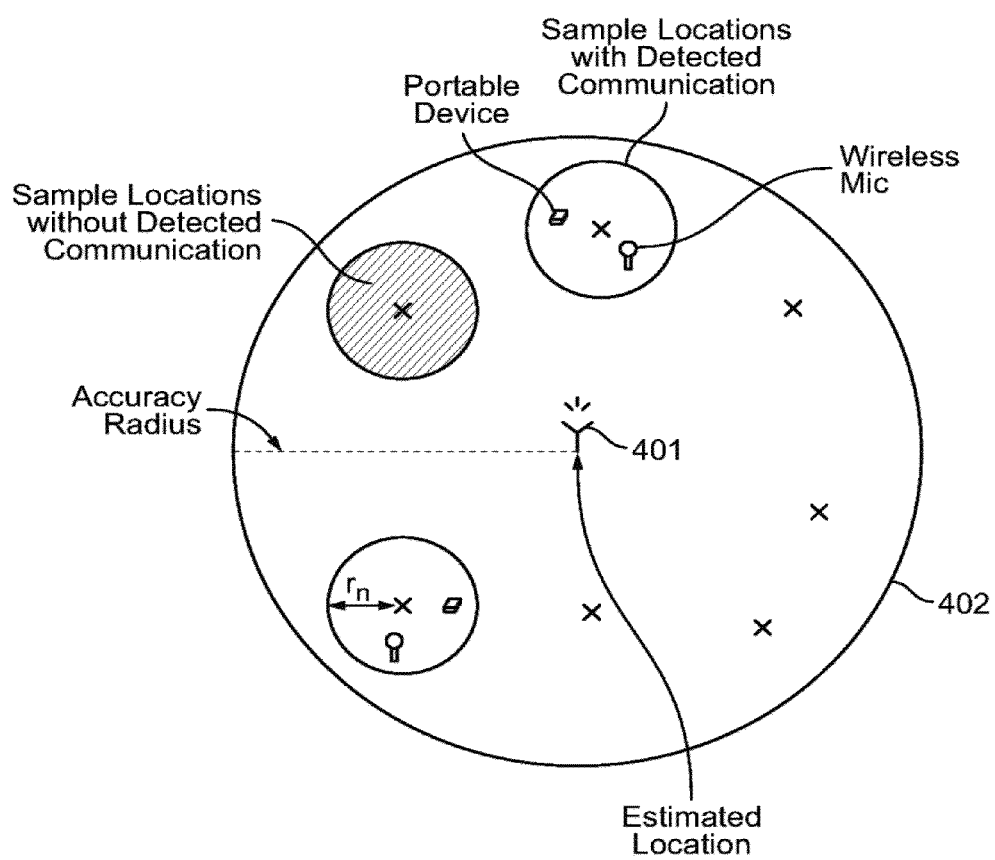
FIG. 4 is a simplified diagram of a wireless communication system.

FIG. 4 is a simplified diagram of a wireless communication system according to some embodiments. FIG. 4 shows a wireless communication device 401 in a communication system. The wireless communication device 401 has a determined estimated location, or geo-location at the center of the circle denoted 402. The estimated geo-location has a correlated accuracy radius. For example, a geo-location estimate having an accuracy within 200 meters would provide a possible location area denoted by the circle 402 having a radius of 200 meters. The wireless communication device 401 may be in any location within the possible location area 402.

The wireless communication device 401 may query a database regarding sample regions within the possible location area 402. The sample regions are denoted by X in FIG. 4. The number of samples required could depend on several factors such as the accuracy of the geo-location technology used by the wireless communication device 401, the geo-location accuracy as specified by regulations, the protection radius of the primary users, and other factors. The device may increase the number of sample regions and the area to be sampled to ensure that a primary user will not be interfered with. A sample region may have a radius $r_n$ which denotes the area that a wireless communication device 401 may interfere with a primary user communication. A sample region may have one or more primary users of one or more frequency bands. A primary user may be a wireless microphone, a portable communication device, or any licensed operator of a particular frequency band. A sample region may also have no primary users for at least one frequency band or channel, which is denoted by the shaded circle in FIG. 4. The operation of the wireless communication device 401 will now be described with respect to FIGS. 5-9.

Figure 5:
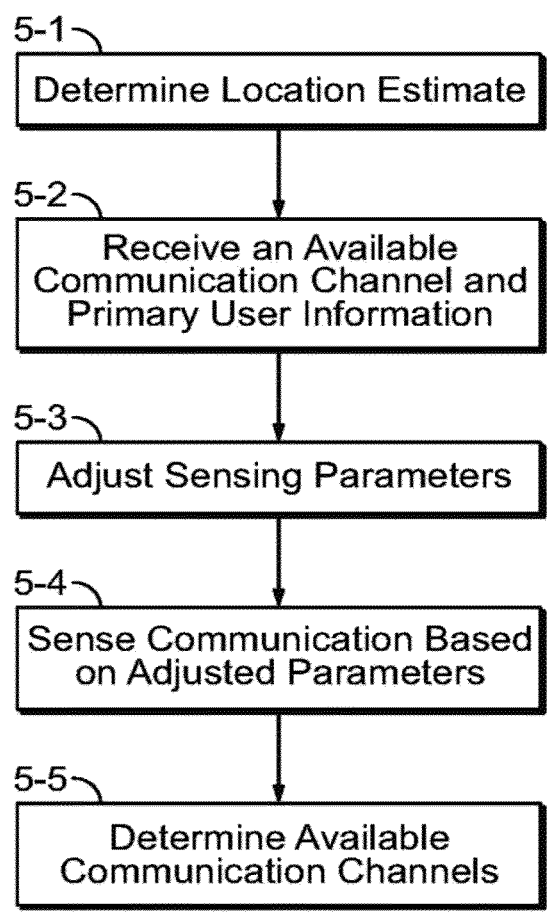
FIG. 5 is a flowchart of an implementation of a method.

FIG. 5 is a flowchart of an implementation of a method according to some embodiments. In one implementation the method is performed by a TV band device, a fusion center, base station, and/or an eNB belonging to a secondary user network. As represented by block 5-1, the method may determine a geo-location estimate of the device. As discussed above, the geo-location estimate may be an accurate location, such as a GPS location, or a less accurate location determination. As represented by block 5-2, the method proceeds by receiving available communication channels or available frequencies and corresponding primary user identification information based on the determined geo-location. The received available communication channel or available frequencies and primary user identification may include one or more of a signal strength, primary user geo-location, frequency associated with a primary user, or a particular frequency band or communication channel for primary user communication as discussed with respect to FIG. 3 above.

As represented by block 5-3, the method proceeds by adjusting sensing parameters of a sensing module. As previously discussed, the sensing parameters may include one or more of a signal strength or transmit power, signal geo-location, a frequency associated with the signal, or a particular frequency range or channel. The sensing may be conducted in any manner incorporating one or more sensing parameters as discussed with respect to the sensing module 303 above. For example, the device may receive a frequency associated with a primary user and adjust a sensing parameter to sense within a frequency range of the frequency associated with the primary user. In the example of a wireless microphone which is registered as a primary user, the device may adjust a sensing parameter to sense within a small range of frequencies (i.e. +/−100 KHz) in a neighborhood of the frequency associated with the wireless microphone. As represented by block 5-4, a primary user communication signal is sensed based on the adjusted parameters. In the example of sensing a wireless microphone, reducing the frequency space to be sensed for primary user communication, results in performance of spectrum sensing with high efficiency and low overhead. As represented by block 5-5, the device may determine available communication channels or frequencies based on a result of the sensing. If a primary user communication is sensed, the device determines that the communication channel or particular frequency range is not available for communication. If no primary user communication is sensed, the device may determine that the communication channel or frequency range is available for communication by the device.

Figure 6:
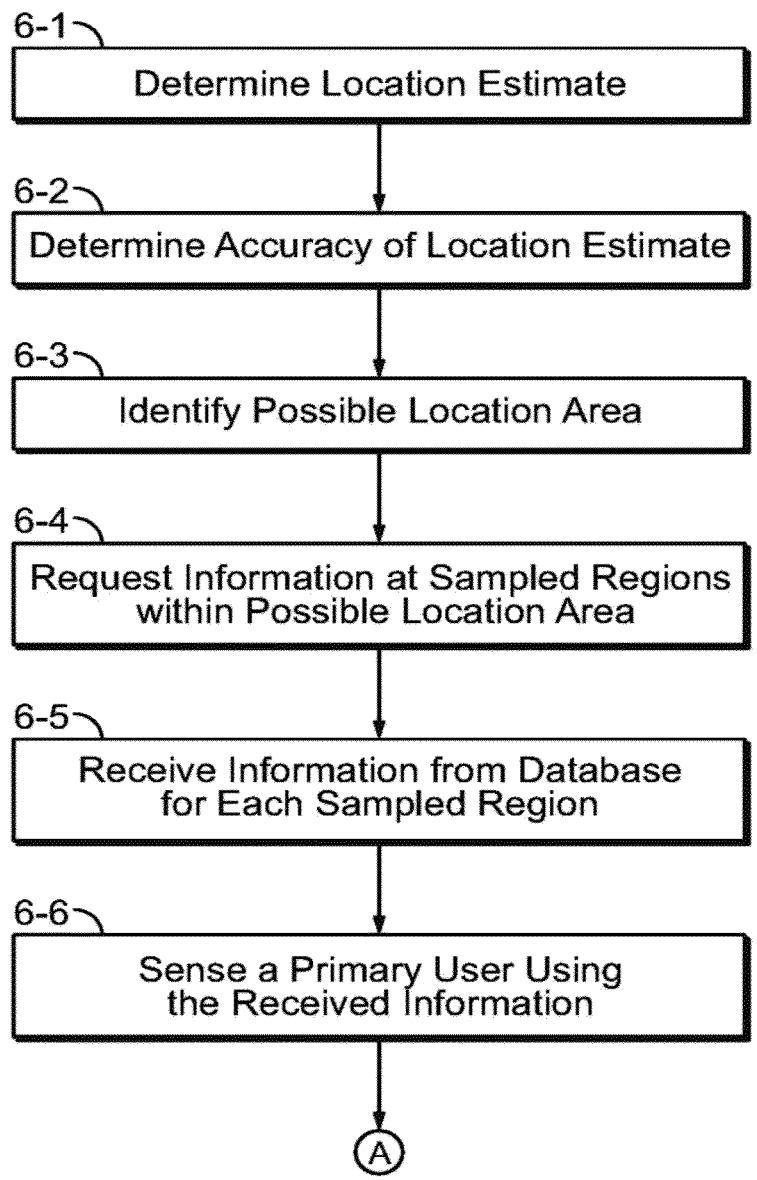
FIG. 6 is a flowchart of an implementation of a method.

FIG. 6 is a flowchart of an implementation of a method according to some embodiments. In one implementation the method is performed by a TV band device, a fusion center, base station, and/or an eNB belonging to a secondary user network. As represented by block 6-1, the method may determine a location estimate. As discussed above, the location estimate may be an accurate geo-location, such as a GPS location, or a less accurate geo-location determination. As represented by block 6-2, the method may determine an accuracy of the location estimate. Given the location estimate and the accuracy, the method may determine a possible area of location for the device as represented by block 6-3. For example, given an accuracy of 100 meters, the method may determine that a device is within an area within a 100 meter radius from the location estimate.

The method proceeds by requesting information at sampled regions within the possible location area as represented by block 6-4. The sampled regions may be a plurality of regions which cover the possible location area. As discussed above, the number of sample regions required could depend on several factors such as the accuracy of the location technology used by the device, the location accuracy as specified by regulations, the protection radius of the primary users, and other factors. For example, in order to meet the FCC requirements regarding TVBD communication, the sampled regions may be a number which samples the possible location area in 50 meter blocks. This feature will be discussed with greater detail with reference to FIG. 10 below.

As represented by block 6-5, the method proceeds by receiving information from an information source or database for each of the sampled regions. As discussed above, the information may include available communication channels or available frequencies and a primary user identifying information for each of the sampled regions. As represented by block 6-6, the method may proceed by sensing a primary user using the received information. The method may use the received information in adjusting the sensing parameters as discussed with respect to FIG. 5 above.

Figure 7:
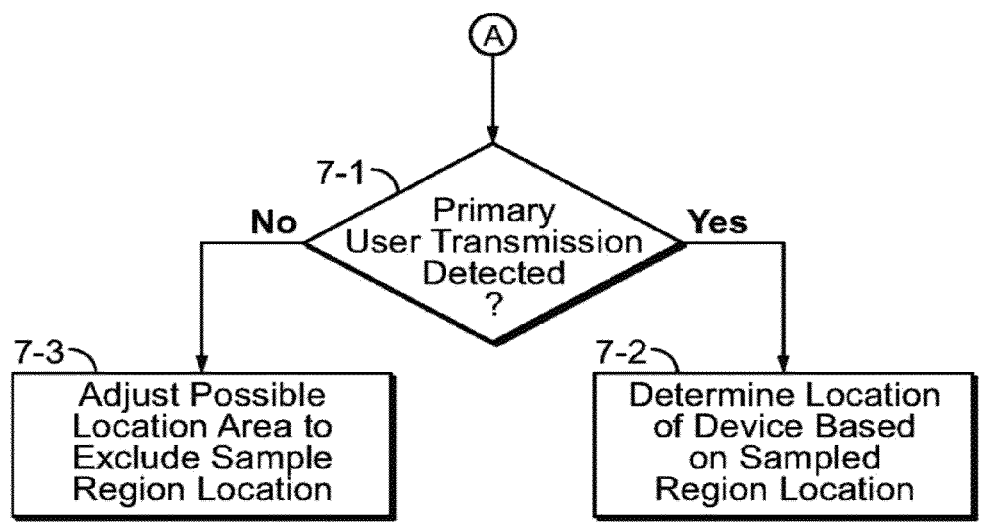
FIG. 7 is a flowchart of an implementation of a method.

The method proceeds to step A, which is represented in FIG. 7. FIG. 7 is a flowchart of an implementation of one method of using a result of the sensing according to some embodiments. As represented by decision block 7-1, the method determines whether a primary user transmission or communication has been detected. If a primary user transmission has been detected (represented by Y branch), the method may determine the geo-location of the sampled region. For example, the device may receive information regarding a particular frequency and a particular primary user using the particular frequency from the information source or database for a particular sampled region. If the device senses a primary user matching the received information, the device may determine that the geo-location of the device corresponds to the geo-location of the sampled region. In some embodiments, the device may determine an accuracy of the sensing result in order to determine the level of reliability in determining the geo-location. The device may also sample a number of other locations surrounding the determined geo-location in order to confirm the determined geo-location.

If the device determines that a primary user transmission or communication is not detected (represented by N branch), the device may then eliminate the sampled region geo-location from the possible location area of the device. For example, if a possible location area of the device encompasses sample regions A-D, and the method determines that a primary user corresponding to sample region A is not present, the method may eliminate sample region A from the possible location area, leaving only sample regions C-D. By sampling the other regions, the method may refine the determined geo-location of the device to a greater level of accuracy. The method represented in FIG. 7 infers that the information received from the information source or database is more accurate than the determined geo-location estimate of the device. As such, the sensing of a primary user which incorporates information received regarding the primary user may be relied upon to refine the determined geo-location estimate.

Figure 8:
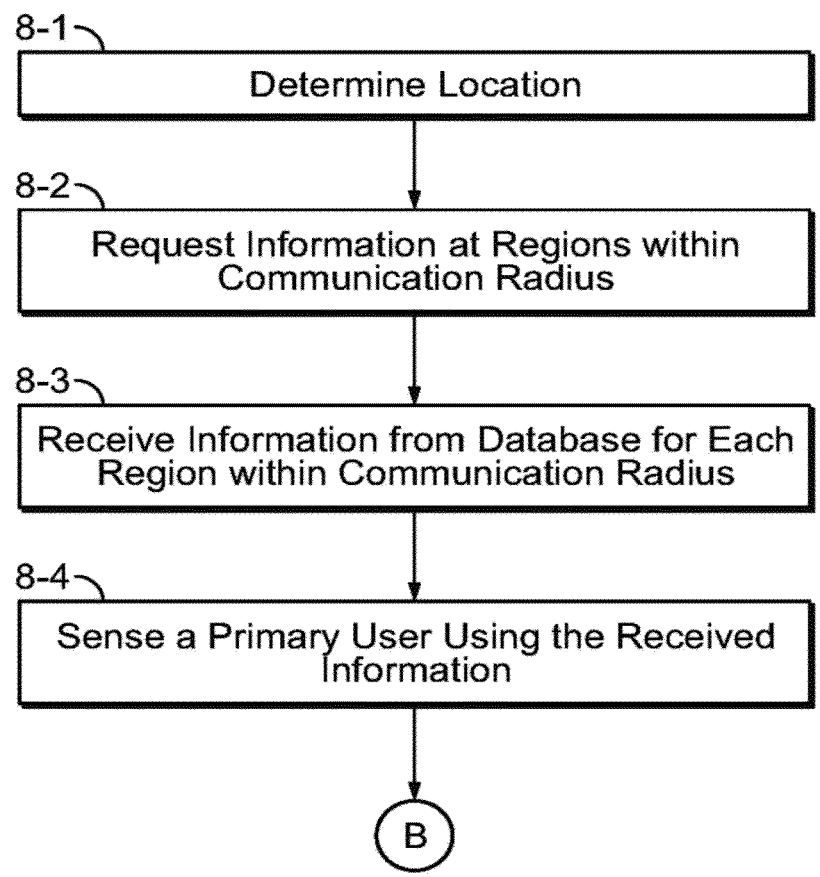
FIG. 8 is a flowchart of an implementation of a method.

FIG. 8 is a flowchart of an implementation of a method according to some embodiments. In one implementation the method is performed by a TV band device, a fusion center, base station, and/or an eNB belonging to a secondary user network. As represented by block 8-1 the method may determine an approximate location of the device. The location or geo-location determined may have a low accuracy level, such as through as an accuracy of no better than 50 meters. As represented by block 8-2, the method may request information at regions within approximate location of the device. The regions may be selected so as to cover the entire area where the device may be located. As represented by block 8-3, the method may receive information from the information source, or database, for each region within the approximate location of the device. As discussed above, the method may determine a plurality of sample regions within the approximate location of the device and request information regarding each of the sample regions. The request may be through one or more queries to a database which contains information regarding each of the sample regions. As represented by block 8-4, the method may sense a primary user using the received information from the information source or database. For example, the TV band device may sense for communications by one or more primary users on one or more communication channels indicated as being allocated to one or more primary users in any of the sample regions. The sensing may be performed as discussed with respect to sensing module 303 above. The method may then proceed to step B, which is represented in FIG. 9.

Figure 9:
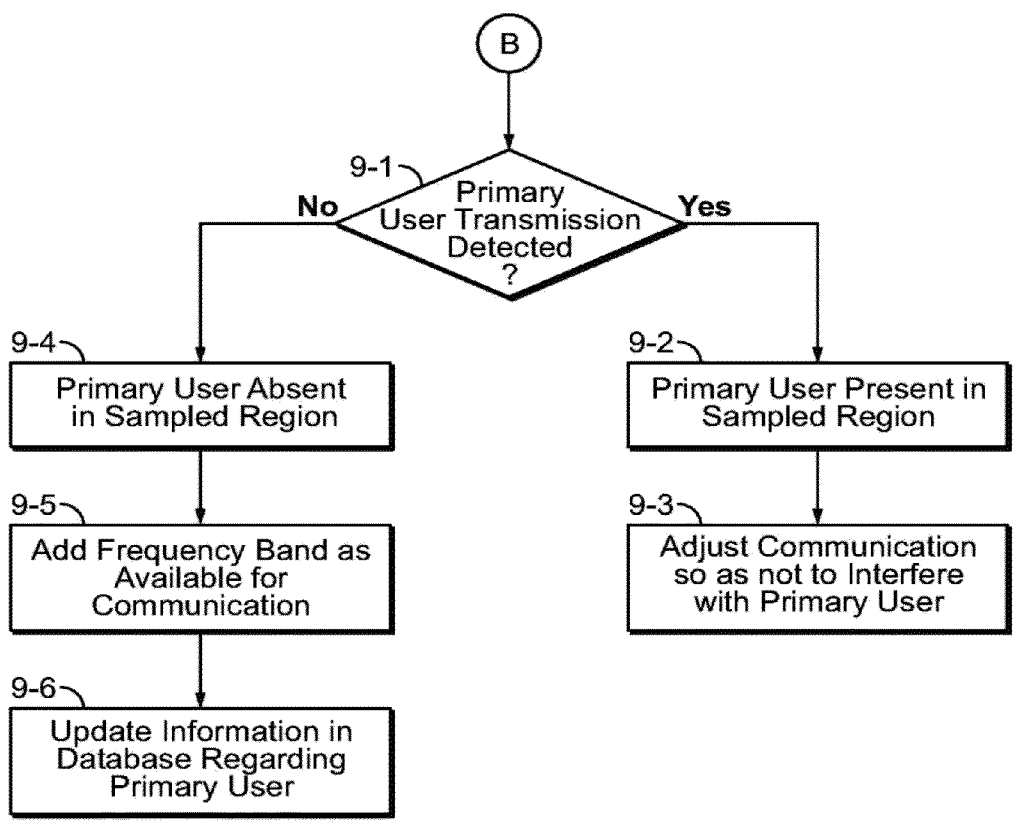
FIG. 9 is a flowchart of an implementation of a method.

FIG. 9 is a flowchart of an implementation of a method according to some embodiments. FIG. 9 shows one method of using a sensing result produced from block 8-4 of FIG. 8. As represented by decision block 9-1, the method determines whether a primary user transmission or communication has been detected.

If a primary user transmission has been detected (represented by Y branch), the method may determine that a primary user is present in the sampled region, as represented by block 9-2. The method may then proceed by adjusting communication so as not to interfere with a primary user transmission as represented by block 9-3. Adjusting communication may include vacating a frequency band in a geographic area that is licensed to a particular primary user. Alternatively, the device may use beam forming antennas to avoid interfering with the primary user. Those skilled in the art will appreciate from the present disclosure that any number of remedial actions may be taken by a secondary user device.

If a primary user transmission has not been detected (represented by N branch), the method may determine that a primary user is absent in a sampled region, as represented by block 9-4. The method may then proceed by adding the frequency band or communication channel to a list of available frequency bands or available communication channels as represented by block 9-5. The TVBD may therefore communicate on the available frequency band. Optionally, the method may then update the information at the information source or database regarding the primary user as represented by block 9-6. For example, if the received information regarding a primary user had indicated that a primary user is always communicating in a given communication channel, but the primary user is not sensed by the device, and the location of the device is accurately determined for that particular geo-location, the device may detect that the information regarding the primary user is invalid. The device may then transmit updated information regarding the primary user. A number of devices may be configured to update the database or information source based on their sensing results. As such, the database or information source may be constantly updated, thereby increasing the accuracy of the information.

The block 9-6 as represented in FIG. 9 infers that the determined geo-location and sensing operations are more accurate than the information received from the database or information source. The database or information source may be configured to allow only certain devices having accurate geo-location determination and sensing capabilities to update the information in the database or information source.

Figure 10:
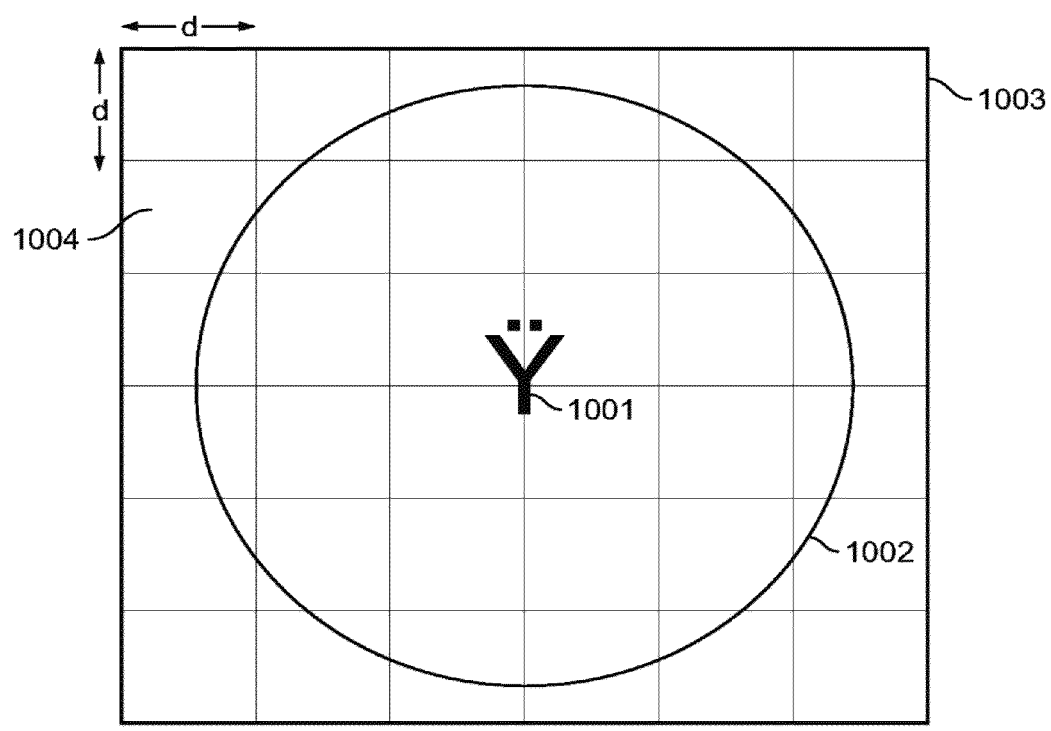
FIG. 10 is a simplified diagram of a wireless communication system.

FIG. 10 is a simplified diagram of a wireless communication system. FIG. 10 shows a communication device 1001. The communication device has a geo-location within a possible location area denoted by 1002. The possible location area 1002 is determined based on a determined estimated location and an accuracy of the geo-location module. Blocks 1004 represent a plurality of sample regions. The sample regions may have a length and width of d as indicated in FIG. 10, but are not limited thereto. Those skilled in the art will appreciate that the shape and area of blocks 1004 may be variable. For example, each of the sample regions 1004 may correspond to a circle having a radius centered about a particular location to be sampled.

The area of the sample regions may correspond to the area required to access an information source or database. The area may also be determined by required regulation. For example, in the case of TVBD, the area may correspond to a grid spacing d of 50 meters. The device may sample regions by querying a database for all regions within a possible location area 1002. The queries may all be performed once a device is powered on, and may be distributed over time once the device is running For example, for a device requiring daily access, a device may query a database more frequently by specifying a different sample region 1004 with each query. The frequency of the querying operation may be configured such that all sample regions 1004 are covered within a 24 hour time period. The frequency of querying or requesting information regarding sample regions 1004 may be configured to meet the needs of a device having any number of access periods or a device having a variable access period.

The device may receive a list of available communication channels and primary user information for each sampled region 1004. The device may determine that the only available communication channels correspond to channels which are common to all sample regions 1004. For example, if information received for each sample region indicates that communication channel A is available for communication, the device may determine that channel A is available. However, if information received for one sample region 1004 indicates that channel A is not available, the device will determine that channel A is not available as a communication channel.

Figure 11:
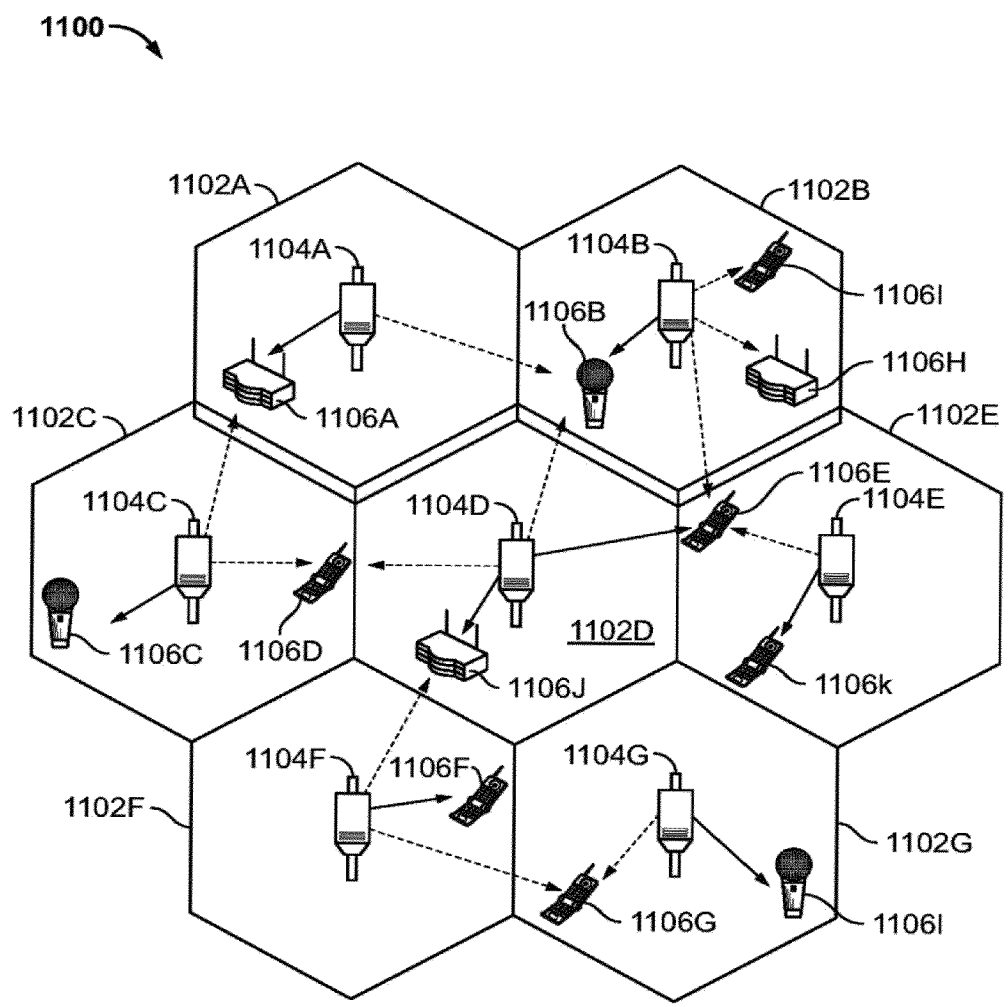
FIG. 11 is a simplified diagram of a wireless communication system.

FIG. 11 is a simplified diagram of a wireless communication system 1100, configured to support a number of users, in which the teachings herein may be implemented. The system 1100 provides communication for multiple cells 1102, such as, for example, macro cells 1102A-1102G, with each cell being serviced by a corresponding access point 1104 (e.g., access points 1104A-1104G). Each access point 1104 may include information regarding available communication channels and primary users for each cell 1102. Each access point 1104 may also contain a database having the location information corresponding to the available communication channels as discussed above, and may communicate the information to each access terminal 1106 and other access points 1104. Access terminals 1106 (e.g., access terminals 1106A-1106L) may be dispersed at various locations throughout the system over time. Each access terminal 1106 may communicate with one or more access points 1104 on a forward link (FL) and/or a reverse link (RL) at a given moment, depending upon whether the access terminal 1106 is active and whether it is in soft handoff, for example. Access terminals 1106 may include any wireless communication device, such as a wireless LAN device, a cellular phone, PDA, or a wireless microphone. The wireless communication system 1100 may provide service over a large geographic region. For example, macro cells 1102A-1102G may cover a few blocks in a densely populated urban neighborhood or several miles in rural environment.

In a network having a relatively small geographic area, a device may employ a network-assisted technique in order to receive available communication channels. A device may rely on the geo-location and/or sensing capabilities of another device in the network in order to determine available communication channels. For example, with reference to FIG. 11, a first device or access terminal 1106A may communicate with an access point 1104A having a determined geo-location and a determined accuracy regarding the determined geo-location. The access terminal 1106A may not have any geo-location or sensing capabilities. The access terminal 1106A may have a reliable communication link to the access point 1104A. Since the access terminal 1106A has a reliable communication link with the access point 1104A, the distance between the access terminal 1106A and the access terminal 1104A may be inferred to be bounded. That is, since the communication capabilities of the access terminal 1106A and/or the access point 1104A may be known, it may be inferred that the distance between the access terminal 1106A and the access point 1104 must be within a distance that allows for a reliable connection between the access terminal 1106A and the access point 1104A. The access point 1104A may determine a plurality of sample regions based on the determined geo-location, the determined accuracy of the determined geo-location, and the maximum distance to the access terminal 1106A having a reliable connection to the access point 1104A. Any of the methods discussed above regarding determining available communications channels, sensing a primary user, and/or refining a determined geo-location may be performed by the access point 1104A on behalf of the access terminal 1106A.

Additionally or alternatively, an access terminal 1106A may measure the reliability of a communication link with any other access terminal 1106 or access point 1104 in a communication network. The access terminal 1106A may rank the access terminals 1106 or access points 1104 based on the measured reliability. The access terminal 1106A may identify the access terminal 1106 or access point 1104 having a high reliability based on the ranking. For example, the access terminal 1106A may identify an access point 1104A as the node having the most reliable communication link. The access terminal 1106A may receive a determined geo-location, and a determined accuracy of the determined geo-location from the access point 1104A. The access terminal 1106A may then determine a number of sample regions based on the information regarding the access point 1104A. As a result, the access terminal may perform the method of requesting information regarding available communications channels in each of the sample regions to determine a common available communication channel as discussed above.

Alternatively, an access terminal 1106A may transmit identifying information regarding the node having the most reliable communication link to an information source containing determined geo-location and accuracy of the determined geo-location for a number of communication nodes in the communication network. For example, an access terminal 1106 may communicate identification information of a node having the most reliable communication link with an operator-owned proxy database. The proxy database may convert the identification information to a geo-location and an accuracy of a geo-location of the identified node based on an estimated or measured coverage area of the identified node. The proxy database may communicate the geo-location and accuracy information to the access terminal 1106. The access terminal may then use the received geo-location and accuracy information to request information regarding available communication channels for determined sample regions to determine a common available communication channel as discussed above.

Alternatively, the proxy database may not transmit the geo-location and accuracy information to the access terminal 1160. Instead, the proxy database may request the information regarding available communication channels for determined sample regions to determine a common available communication channel on behalf of the access terminal 1160. The proxy database may be configured to cache the responses to the requests in order to reduce the number of requests to the information source. The cached results may be cleared after a predetermined time period. For example, the proxy database may be configured to be a parallel database which is frequently synchronized with a master or global database in order to reduce the number of queries to the master or global database.

Figure 12:
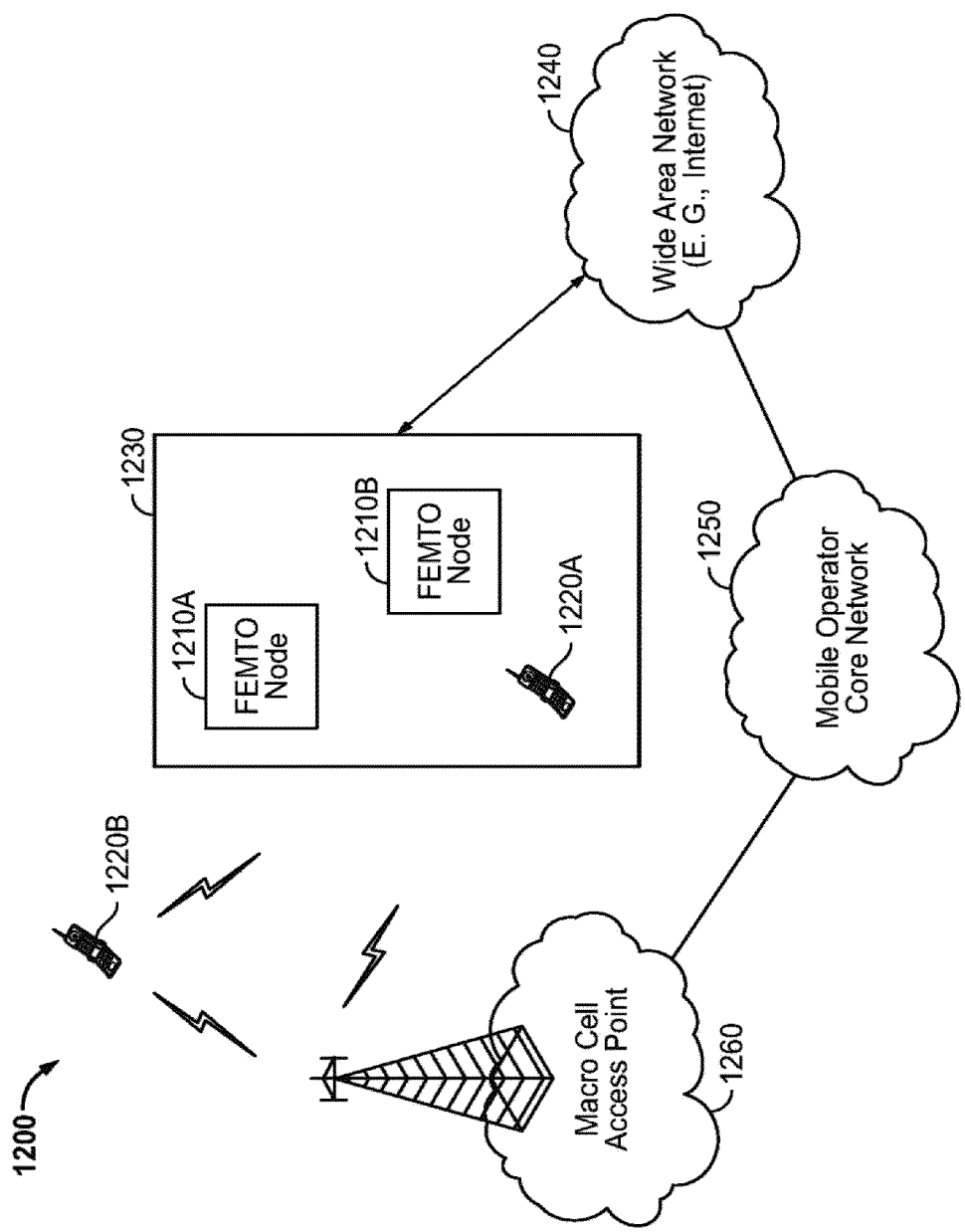
FIG. 12 is a simplified diagram of a wireless communication system including femto nodes.

FIG. 12 is a simplified diagram of an exemplary communication system 1200 where one or more femto nodes are deployed within a network environment and in which the teachings herein may be implemented. Specifically, the system 1200 includes multiple femto nodes 1210 (e.g., femto nodes 1210A and 1210B) installed in a relatively small scale network environment (e.g., in one or more user residences 1230). Each femto node 1210 may be coupled to a wide area network 1240 (e.g., the Internet) and a mobile operator core network 1250 via a DSL router, a cable modem, a wireless link, or other connectivity means (not shown). As will be discussed below, each femto node 1210 may be configured to serve associated access terminals 1220 (e.g., access terminal 1220A) and, optionally, alien access terminals 1220 (e.g., access terminal 1220B). In other words, access to femto nodes 1210 may be restricted whereby a given access terminal 1220 may be served by a set of designated (e.g., home femto node(s) 1210 but may not be served by any non-designated femto nodes 1210 (e.g., a neighbor's femto node 1210).

An access terminal 1220A corresponding to a home femto node 1210 may be registered as a primary user, and an alien access terminal 1220B may be registered as a secondary user of a communication channel. Each femto node 1210 may contain or request the information regarding the available communication channels and primary users in the form of the database discussed above. For example, a femto node 1210A may contain information regarding a plurality of communication channels and associated home access terminals 1220A registered as primary users for at least one of the channels. An alien access terminal 1220B may perform any of the methods discussed above with respect to communicating with the femto nodes 1210 in order to determine at least one available communication channel so as not to interfere with a primary user and/or to refine a determined geo-location. For example, an alien access terminal 1220B may query one or more femto nodes 1220 using a determined geo-location and sensing method as discussed with respects to the methods of FIGS. 6-7 above in order to more accurately determine its geo-location. An alien access terminal 1220B may also use a geo-location only method as discussed with respect to FIG. 10 in order to request information from one or more femto nodes 1210 to determine at least one available communication channel. Furthermore, a global database may also reside in the mobile operator network 1250 having all information corresponding to each femto node 1210 in the system. The database may also reside in the macro cell access point 1260 and the wide area network 1240. Finally, the database may also reside in a server maintained by a third party, such that each femto node 1210 and/or each access terminal 1220 may access the database through a network connection or the internet. An access terminal 1220 may be configured to query the database in order to perform any of the methods discussed with respect to FIGS. 5-10 above.

Figure 13:
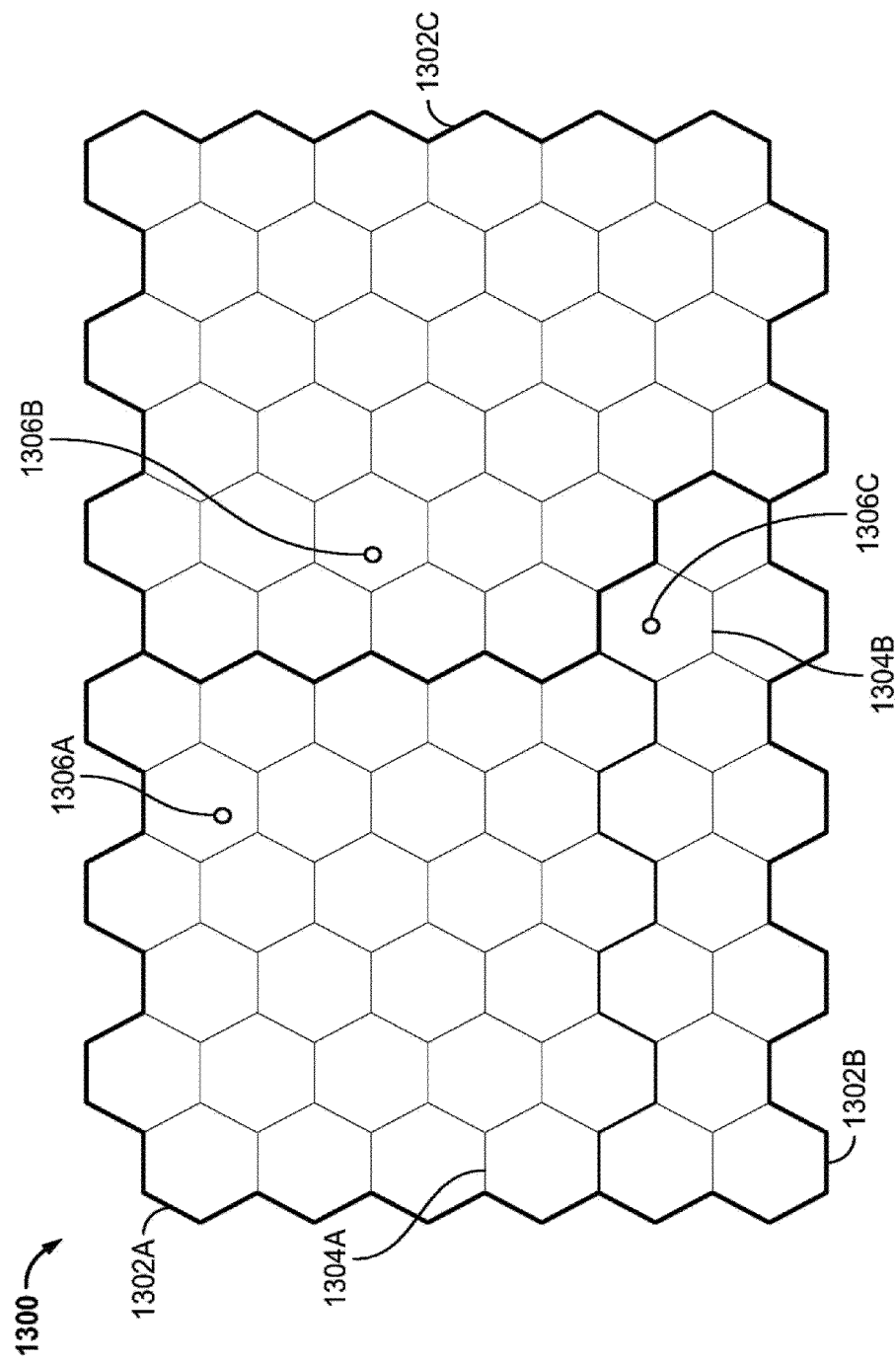
FIG. 13 is a simplified diagram illustrating coverage areas for wireless communication.

FIG. 13 is a simplified diagram illustrating an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 may be defined with a given tracking area 1302 or macro coverage area 1304. Also, one or more pico coverage areas (not shown) may be defined within a given tracking area 1302 or macro coverage area 1304.

Referring again to FIG. 12, the owner of a femto node 1210 may subscribe to mobile service, such as, for example, 3G mobile service, offered through the mobile operator core network 1250. In addition, an access terminal 1220 may be capable of operating both in macro environments and in smaller scale (e.g., residential) network environments. In other words, depending on the current location of the access terminal 1220, the access terminal 1220 may be served by a macro cell access point 1260 associated with the mobile operator core network 1250 or by any one of a set of femto nodes 1210 (e.g., the femto nodes 1210A and 1210B that reside within a corresponding user residence 1230). For example, when a subscriber is outside his home, he is served by a standard macro access point (e.g., access point 1260) and when the subscriber is at home, he is served by a femto node (e.g., node 1210A). Here, it should be appreciated that a femto node 1210 may be backward compatible with existing access terminals 1220.

A femto node 1210 may be deployed on a single frequency or, in the alternative, on multiple frequencies. Depending on the particular configuration, the single frequency or one or more of the multiple frequencies may overlap with one or more frequencies used by a macro access point (e.g., access point 1260).

In some aspects, an access terminal 1220 may be configured to connect to a preferred femto node (e.g., the home femto node of the access terminal 1220) whenever such connectivity is possible. For example, whenever the access terminal 1220 is within the user's residence 1230, it may be desired that the access terminal 1220 communicate only with the home femto node 1210. A database may register all users having a geo-location associated with a preferred femto node as secondary users in order to limit unnecessary access to communication channels. For example, a macro cell access point 1260 may require that an access terminal 1220 use a communication channel of a preferred femto node whenever one is available. As such, an access terminal, such as a home access terminal 1220A, may be limited to communication channels of a preferred femto node, i.e. 1210A, while residing in a geo-location within an area 1230. The access terminal 1220 may perform any of the methods discussed above in order to access available communication channels not associated with the preferred femto node, while residing in a geo-location within an area 1230.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1210 that reside within the corresponding user residence 1230). In some implementations, a node may be restricted to not provide, for at least one node, at least one of: signaling, data access, registration, paging, or service. The restrictions may be registered within the database as primary and secondary user designations for a given communication channel as discussed above. A secondary user or access terminal may perform the methods discussed above in order to access available communications channels.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a closed subscriber group (CSG) may be defined as the set of access points (e.g., femto nodes) that share a common access control list of access terminals. A restricted access point may include a CSG that allows multiple access terminals to connect to it. A single access terminal may have the ability to connect to multiple restricted access points. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node) and may be designated as a primary user. A guest access terminal may refer to an access terminal with temporary access to the restricted femto node (e.g., limited based on deadline, time of use, bytes, connection count, or some other criterion or criteria) and may be designated as a secondary user. An alien access terminal may refer to an access terminal that does not have permission to access the restricted femto node, except for perhaps emergency situations, for example, such as 911 calls (e.g., an access terminal that does not have the credentials or permission to register with the restricted femto node) and may be designated as a tertiary user.

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
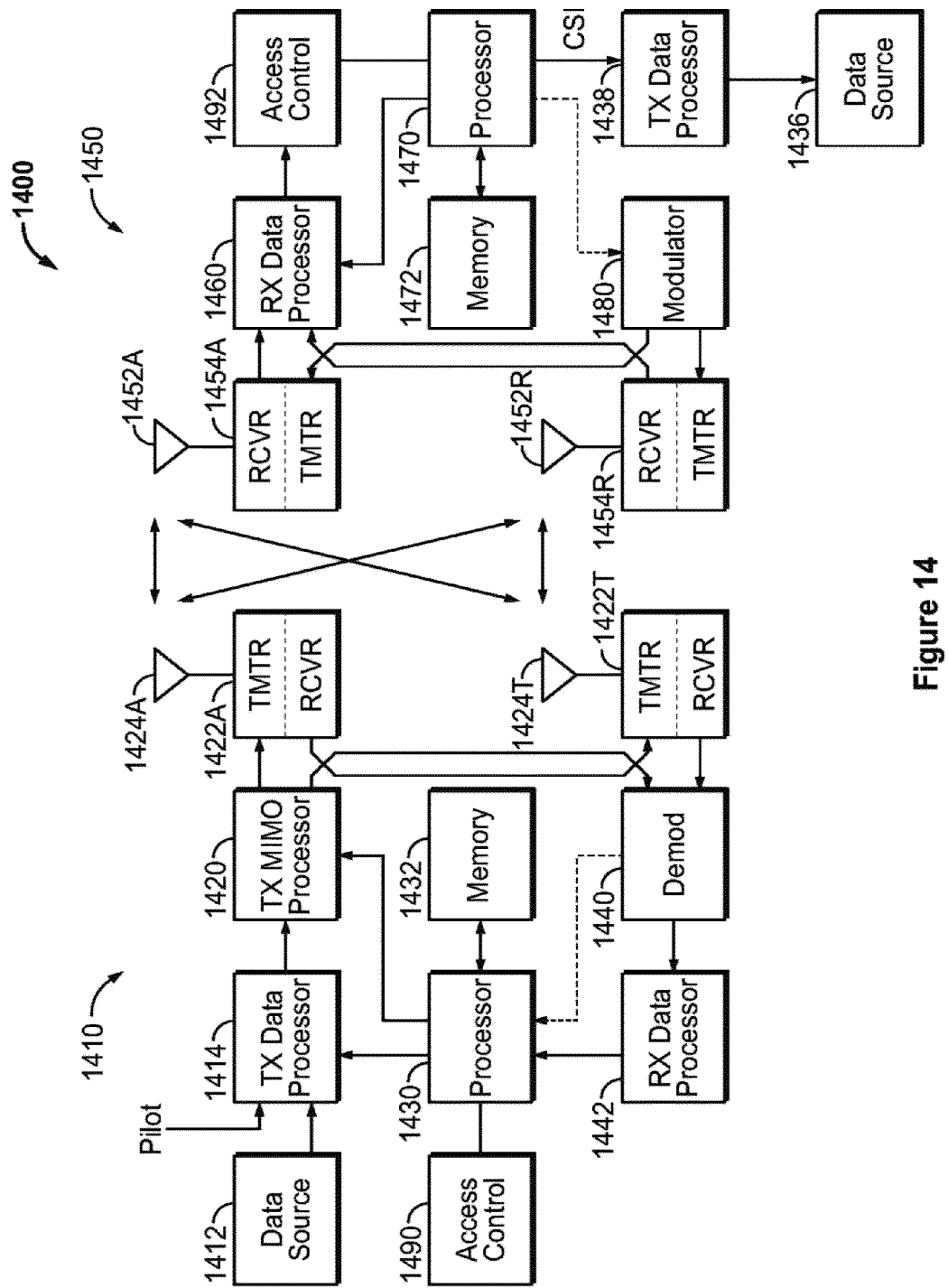
FIG. 14 is a simplified block diagram of several sample aspects of communication components.

The teachings herein may be incorporated into a node (e.g., a device) employing various components for communicating with at least one other node. FIG. 14 depicts several sample components that may be employed to facilitate communication between nodes. Specifically, FIG. 14 is a simplified block diagram of a first wireless device 1410 (e.g., an access point) and a second wireless device 1450 (e.g., an access terminal) of a MIMO system 1400. At the first device 1410, traffic data for a number of data streams is provided from a data source 1412 to a transmit (TX) data processor 1414.

In some aspects, each data stream is transmitted over a respective transmit antenna. The TX data processor 1414 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1430. A data memory 1432 may store program code, data, and other information used by the processor 1430 or other components of the device 1410.

The modulation symbols for all data streams are then provided to a TX MIMO processor 1420, which may further process the modulation symbols (e.g., for OFDM). The TX MIMO processor 1420 then provides $N_T$ modulation symbol streams to $N_T$ transceivers (XCVR) 1422A through 1422T. In some aspects, the TX MIMO processor 1420 applies beam-forming weights to the symbols of the data streams and to the antenna from which the symbol is being transmitted.

Each transceiver 1422 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1422A through 1422T are then transmitted from $N_T$ antennas 1424A through 1424T, respectively.

At the second device 1450, the transmitted modulated signals are received by $N_R$ antennas 1452A through 1452R and the received signal from each antenna 1452 is provided to a respective transceiver (XCVR) 1454A through 1454R. Each transceiver 1454 conditions (e.g., filters, amplifies, and downconverts) a respective received signal, digitizes the conditioned signal to provide samples, and further processes the samples to provide a corresponding "received" symbol stream.

A receive (RX) data processor 1460 then receives and processes the $N_R$ received symbol streams from $N_R$ transceivers 1454 based on a particular receiver processing technique to provide $N_T$ "detected" symbol streams. The RX data processor 1460 then demodulates, deinterleaves, and decodes each detected symbol stream to recover the traffic data for the data stream. The processing by the RX data processor 1460 is complementary to that performed by the TX MIMO processor 1420 and the TX data processor 1414 at the device 1410.

A processor 1470 periodically determines which pre-coding matrix to use (discussed below). The processor 1470 formulates a reverse link message comprising a matrix index portion and a rank value portion. A data memory 1472 may store program code, data, and other information used by the processor 1470 or other components of the second device 1450.

The reverse link message may comprise various types of information regarding the communication link and/or the received data stream. The reverse link message is then processed by a TX data processor 1438, which also receives traffic data for a number of data streams from a data source 1436, modulated by a modulator 1480, conditioned by the transceivers 1454A through 1454R, and transmitted back to the device 1410.

At the device 1410, the modulated signals from the second device 1450 are received by the antennas 1424, conditioned by the transceivers 1422, demodulated by a demodulator (DEMOD) 1440, and processed by a RX data processor 1442 to extract the reverse link message transmitted by the second device 1450. The processor 1430 then determines which precoding matrix to use for determining the beam-forming weights then processes the extracted message.

FIG. 14 also illustrates that the communication components may include one or more components that perform access control operations as taught herein. For example, an access control component 1490 may cooperate with the processor 1430 and/or other components of the device 1410 to send/receive signals to/from another device (e.g., device 1450) as taught herein. Similarly, an access control component 1492 may cooperate with the processor 1470 and/or other components of the device 1450 to send/receive signals to/from another device (e.g., device 1410). It should be appreciated that for each device 1410 and 1450 the functionality of two or more of the described components may be provided by a single component. For example, a single processing component may provide the functionality of the access control component 1490 and the processor 1430 and a single processing component may provide the functionality of the access control component 1492 and the processor 1470.

Figure 15:
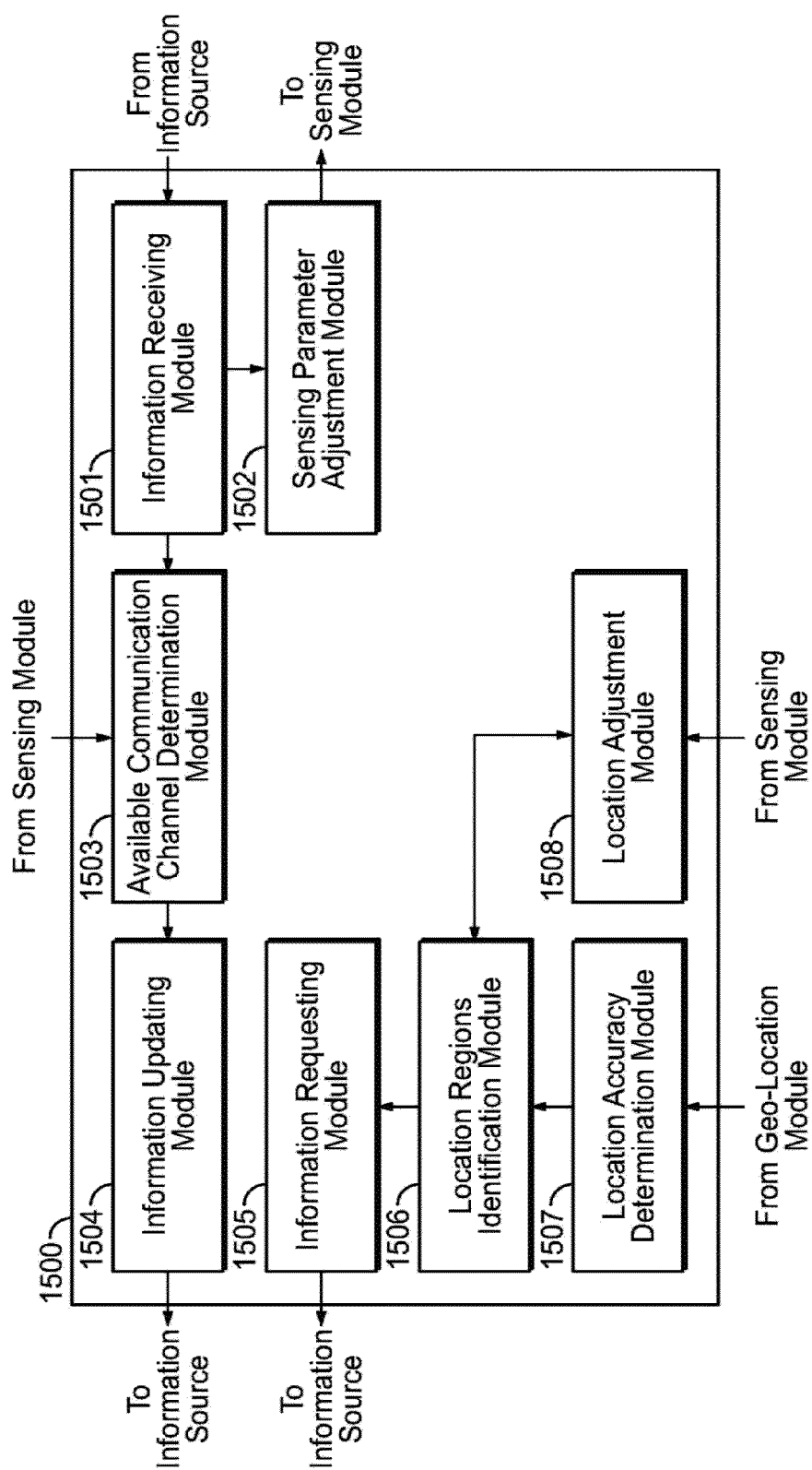
FIG. 15 is a simplified block diagram several sample aspects of components of a processing module.

FIG. 15 is a simplified block diagram several sample aspects of components of a processing module according to some embodiments. As shown, the processing module 1500 may comprise an information receiving module 1501, a sensing parameter adjustment module 1502, an available communication channel determination module 1503, an information updating module 1504, an information requesting module 1505, a location regions identification module 1506, a location accuracy determination module 1507, and a location adjustment module 1508. The information receiving module 1501 receives information from an information source as described above. The sensing parameter adjustment module 1502 is coupled to the information receiving module 1501 and may be configured to adjust at least one sensing parameter of a sensing module. The available communication channel determination module 1503 may receive information from a sensing module and from the information receiving module 1501 in order to determine the available communication channels as discussed above. The information updating module 1504 may be coupled to the available communication channel module 1503, and may transmit an updated available communication channel or primary user information to the information source as discussed above. The location accuracy determination module 1507 may determine a location accuracy of a determined geo-location received from a geo-location module as discussed above. The location regions identification module 1506 may be coupled to the location accuracy determination module 1507 and may determine the sample regions based on the accuracy and the geo-location information as discussed above. The information requesting module 1505 may be coupled to the location regions identification module 1506 and may request information from an information source regarding the identified sample regions. The location adjustment module 1508 may be coupled to the location regions identification module 1506 and may receive information from the sensing module in order to refine a determined geo-location as discussed above.

FIG. 15 shows one implementation of a processing module 1500 according to some embodiments. However, modules 1501-1508 may reside in other components of a device. Furthermore, modules 1501-1508 may not be required for a device not having all of the capabilities of the various embodiments described above.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 2 and 11-15 may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method implemented in a wireless apparatus configured for communication in a network, the method comprising:
    estimating a location of the wireless apparatus;
    determining an area within which the wireless apparatus is located based on the estimated location and an accuracy of the location estimate;
    identifying a plurality of regions, each region corresponding to a portion of the area, wherein the number of regions in the plurality of regions depends on the accuracy of the location estimate, and wherein identifying the plurality of regions comprises querying a database regarding regions within the area;
    receiving information regarding the plurality of regions, wherein the information is indicative of one or more communication channels being allocated for communication within one or more of the plurality of regions;
    sensing for communications on the one or more communication channels; and
    determining availability of the one or more communication channels based on the sensing.

2. The method of claim 1, wherein the information further comprises a waveform used for communication in the one or more of the plurality of regions, and wherein sensing for communications comprising sensing for the waveform on the one or more communication channels.

3. The method of claim 1, wherein the information further comprises one or more of a signal strength, primary user geo-location, a frequency associated with a primary user, and a particular frequency band or channel for primary user communication, and wherein sensing is based on the information.

4. The method of claim 1, wherein the area is determined based on a cellular identifier of a device with which the wireless apparatus is engaged in communication.

5. The method of claim 1, further comprising communicating on at least one of the one or more communication channels determined to be available.

6. The method of claim 1, wherein the plurality of regions combined at least equal the determined area.

7. The method of claim 1, further comprising querying a database for the information regarding the plurality of regions.

8. A wireless apparatus configured for communication in a network, the apparatus comprising:
    a processor configured to:
        estimate a location of the wireless apparatus;
        determine an area within which the wireless apparatus is located based on the estimated location and an accuracy of the location estimate; and identify a plurality of regions, each region corresponding to a portion of the area, wherein the number of regions in the plurality of regions depends on the accuracy of the location estimate, and wherein identifying the plurality of regions comprises querying a database regarding regions within the area;

a receiver configured to receive information regarding the plurality of regions, wherein the information is indicative of one or more communication channels being allocated for communication within one or more of the plurality of regions; and a sensing module configured to sense for communications on the one or more communication channels, the processor further being configured to determine availability of the one or more communication channels based on the sensing.

9. The apparatus of claim 8, wherein the information further comprises a waveform used for communication in the one or more of the plurality of regions, and wherein sensing for communications comprising sensing for the waveform on the one or more communication channels.

10. The apparatus of claim 8, wherein the information further comprises one or more of a signal strength, primary user geo-location, a frequency associated with a primary user, and a particular frequency band or channel for primary user communication, and wherein sensing is based on the information.

11. The apparatus of claim 8, wherein the area is determined based on a cellular identifier of a device with which the wireless apparatus is engaged in communication.

12. The apparatus of claim 8, further comprising a transmitter configured to communicate on at least one of the one or more communication channels determined to be available.

13. The apparatus of claim 8, wherein the plurality of regions combined at least equal the determined area.

14. The apparatus of claim 8, further comprising a transmitter configured to transmit a query to a database for the information regarding the plurality of regions.

15. A wireless apparatus configured for communication in a network, the apparatus comprising:
   means for estimating a location of the wireless apparatus;
   means for determining an area within which the wireless apparatus is located based on the estimated location and an accuracy of the location estimate;
   means for identifying a plurality of regions, each region corresponding to a portion of the area, wherein the number of regions in the plurality of regions depends on the accuracy of the location estimate, and wherein means for identifying the plurality of regions comprises means for querying a database regarding regions within the area;
   means for receiving information regarding the plurality of regions, wherein the information is indicative of one or more communication channels being allocated for communication within one or more of the plurality of regions;
   means for sensing for communications on the one or more communication channels; and
   means for determining availability of the one or more communication channels based on the sensing.

16. The apparatus of claim 15, wherein the information further comprises a waveform used for communication in the one or more of the plurality of regions, and wherein sensing for communications comprising sensing for the waveform on the one or more communication channels.

17. The apparatus of claim 15, wherein the information further comprises one or more of a signal strength, primary user geo-location, a frequency associated with a primary user, and a particular frequency band or channel for primary user communication, and wherein sensing is based on the information.

18. The apparatus of claim 15, wherein the area is determined based on a cellular identifier of a device with which the wireless apparatus is engaged in communication.

19. The apparatus of claim 15, further comprising means for communicating on at least one of the one or more communication channels determined to be available.

20. The apparatus of claim 15, wherein the plurality of regions combined at least equal the determined area.

21. The apparatus of claim 15, further comprising means for querying a database for the information regarding the plurality of regions.

22. A computer program product comprising:
   a non-transitory computer readable medium having stored thereon code for causing a computer to:
      estimate a location of the wireless apparatus;
      determine an area within which a wireless apparatus is located based on the estimated location and an accuracy of the location estimate;
      identify a plurality of regions, each region corresponding to a portion of the area, wherein the number of regions in the plurality of regions depends on the accuracy of the location estimate, and wherein identifying the plurality of regions comprises querying a database regarding regions within the area;
      receive information regarding the plurality of regions, wherein the information is indicative of one or more communication channels being allocated for communication within one or more of the plurality of regions;
      sense for communications on the one or more communication channels; and
      determine availability of the one or more communication channels based on the sensing.

23. The computer program product of claim 22, wherein the information further comprises a waveform used for communication in the one or more of the plurality of regions, and wherein sensing for communications comprising sensing for the waveform on the one or more communication channels.

24. The computer program product of claim 22, wherein the information further comprises one or more of a signal strength, primary user geo-location, a frequency associated with a primary user, and a particular frequency band or channel for primary user communication, and wherein sensing is based on the information.

25. The computer program product of claim 22, wherein the area is determined based on a cellular identifier of a device with which the wireless apparatus is engaged in communication.

26. The computer program product of claim 22, wherein the code further causes the computer to communicate on at least one of the one or more communication channels determined to be available.

27. The computer program product of claim 22, wherein the plurality of regions combined at least equal the determined area.

28. The computer program product of claim 22, wherein the code further causes the computer to query a database for the information regarding the plurality of regions.

* * * * *